United States Patent
Kalafala et al.

(10) Patent No.: US 9,754,062 B2
(45) Date of Patent: Sep. 5, 2017

(54) TIMING ADJUSTMENTS ACROSS TRANSPARENT LATCHES TO FACILITATE POWER REDUCTION

(71) Applicant: International Business Machines Corporation, Armonk, NY (US)

(72) Inventors: Kerim Kalafala, Rhinebeck, NY (US); Gregory M. Schaeffer, Poughkeepsie, NY (US); Stephen G. Shuma, Underhill, VT (US); Paul G. Villarrubia, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 14/934,422

(22) Filed: Nov. 6, 2015

(65) Prior Publication Data

US 2017/0132347 A1    May 11, 2017

(51) Int. Cl.
*G06F 17/50* (2006.01)

(52) U.S. Cl.
CPC ...... *G06F 17/5068* (2013.01); *G06F 17/5031* (2013.01); *G06F 17/5059* (2013.01); *G06F 2217/84* (2013.01)

(58) Field of Classification Search
CPC .............. G06F 17/5031; G06F 17/5045; G06F 17/5059; G06F 17/5068; G06F 2217/78
USPC .......................... 716/108–109, 113, 132–134
See application file for complete search history.

(56) References Cited

U.S. PATENT DOCUMENTS

| | | | |
|---|---|---|---|
| 5,579,510 A | 11/1996 | Wang et al. | |
| 6,996,515 B1 | 2/2006 | Foltin et al. | |
| 2004/0123259 A1* | 6/2004 | You | G06F 17/5031 716/113 |
| 2006/0048085 A1* | 3/2006 | Tyler | G06F 17/5031 716/113 |
| 2007/0089076 A1 | 4/2007 | Amatangelo | |
| 2007/0226668 A1* | 9/2007 | Dasdan | G06F 17/5031 716/108 |
| 2009/0055780 A1* | 2/2009 | Acar | G06F 17/5031 716/132 |
| 2009/0119630 A1 | 5/2009 | Binder et al. | |
| 2009/0293030 A1 | 11/2009 | Darsow et al. | |
| 2009/0293031 A1 | 11/2009 | Darsow et al. | |
| 2013/0111425 A1 | 5/2013 | Kumar et al. | |

* cited by examiner

*Primary Examiner* — Paul Dinh
(74) *Attorney, Agent, or Firm* — Cantor Colburn LLP

(57) ABSTRACT

A method of implementing timing adjustments across a transparent latch of an integrated circuit, a system, and a computer program product are described. The method includes obtaining initial input timing slack and input potential power savings at an input and an initial output timing slack and output potential power savings at an output of the transparent latch. The method also includes adjusting a cycle boundary of the transparent latch to obtain a new input timing slack at the input and a new output timing slack at the output of the transparent latch, wherein the new input timing slack is greater than the initial input timing slack based on the input potential power savings being greater than the output potential power savings and the new output timing slack is greater than the initial output timing slack based on the output potential power savings being greater than the input potential power savings.

20 Claims, 3 Drawing Sheets

TIMING ADJUSTMENTS ACROSS TRANSPARENT LATCHES TO FACILITATE POWER REDUCTION

BACKGROUND

The present invention relates to timing adjustments in digital integrated circuits, and more specifically, to timing adjustments across transparent latches to facilitate power reduction.

Digital integrated circuits (ICs) or chips include many components to perform processing and storage. One of the primary considerations in the selection and placement of these components is the timing requirements of the chip. Among the chip components, two types of storage elements include non-transparent latches (e.g., flip-flops) and transparent latches. Unlike edge-triggered non-transparent latches, transparent latches are able to transmit data during the period when the clock is active. During static timing analysis, which is used to verify the timing correctness of digital integrated circuits, transparent latches are often analyzed by assuming a discrete cycle boundary within the active clock interval by which a stable value will propagate to the latch output.

SUMMARY

Embodiments include a method, system, and computer program product to implement timing adjustments across a transparent latch of an integrated circuit. Aspects include obtaining, using a processor, initial input timing slack and input potential power savings at an input of the transparent latch; obtaining, using the processor, initial output timing slack and output potential power savings at an output of the transparent latch; and adjusting a cycle boundary of the transparent latch to obtain a new input timing slack at the input of the transparent latch and a new output timing slack at the output of the transparent latch, wherein the new input timing slack is greater than the initial input timing slack based on the input potential power savings being greater than the output potential power savings and the new output timing slack is greater than the initial output timing slack based on the output potential power savings being greater than the input potential power savings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, during static timing analysis, the cycle boundary within the active clock interval, known as the transparent interval, of a transparent latch triggers data storage. The selection of this cycle boundary affects timing slack at both the input and output of the transparent latch. Previously, the cycle boundary has been selected to balance the positive timing slack at the input and output of the transparent latch. Embodiments of the systems and methods described herein relate to selecting the cycle boundary not only in consideration of timing slack but also in consideration of power reduction. As detailed below, power saving potential at both the input side and at the output side of a transparent latch are considered, and the cycle boundary is adjusted to increase timing slack at the side with the higher power saving potential according to the embodiments detailed below. This is because power reduction potential increases as positive timing slack increases. For example, as more positive timing slack becomes available, there exists a greater degree of freedom to power down circuits, use different threshold devices, eliminate buffers, etc.

Figure 1:
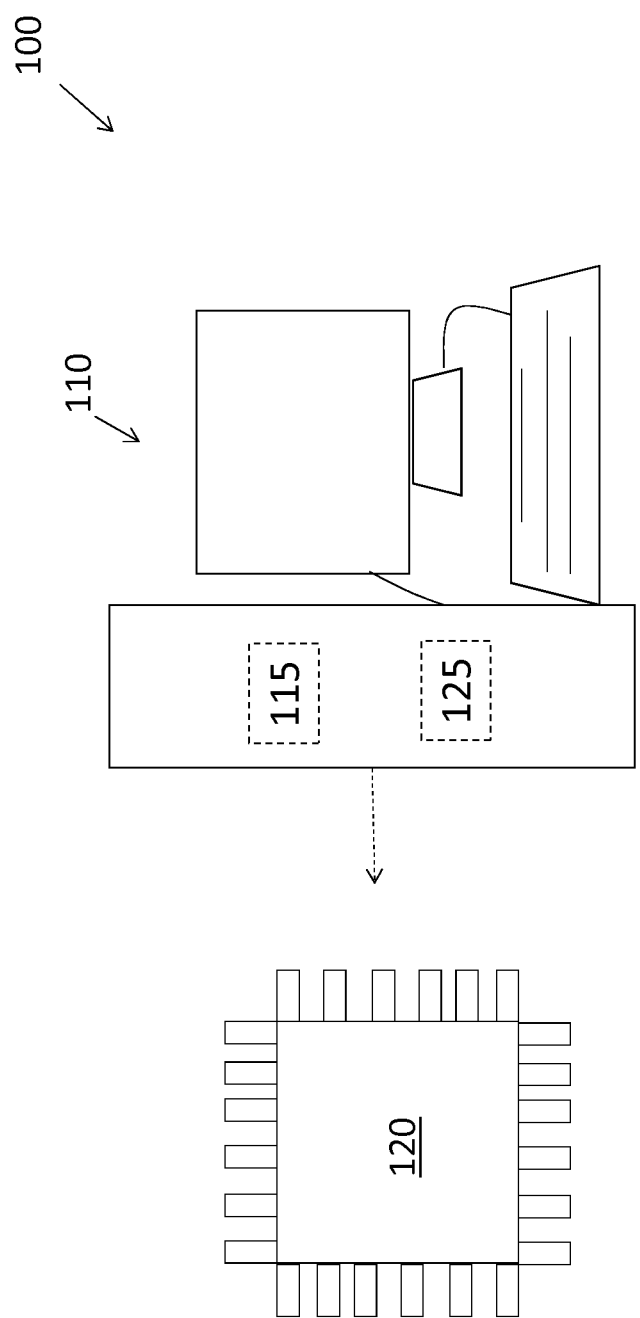
FIG. 1 is a block diagram of a system used to design a digital IC according to embodiments.

FIG. 1 is a block diagram of a system 100 used to design a digital IC 120 according to embodiments. The system 100 includes a processing system 110 used to design an integrated circuit and the resulting physical implementation of the integrated circuit 120. The system 100 includes additional known components that perform functions such as, for example, obtaining measurements from the integrated circuit 120 that are provided to the processing system 110 as needed. The processing system 110 includes one or more memory devices 115 and one or more processors 125. The processing system 110 includes additional known components such as an interface to receive user input, display information, and communicate (e.g., wirelessly) with other systems. The memory device 115 stores instructions implemented by the processor 125. According to the embodiments discussed below, these instructions include processes used to design timing adjustments across transparent latches to facilitate power reduction.

Figure 2:
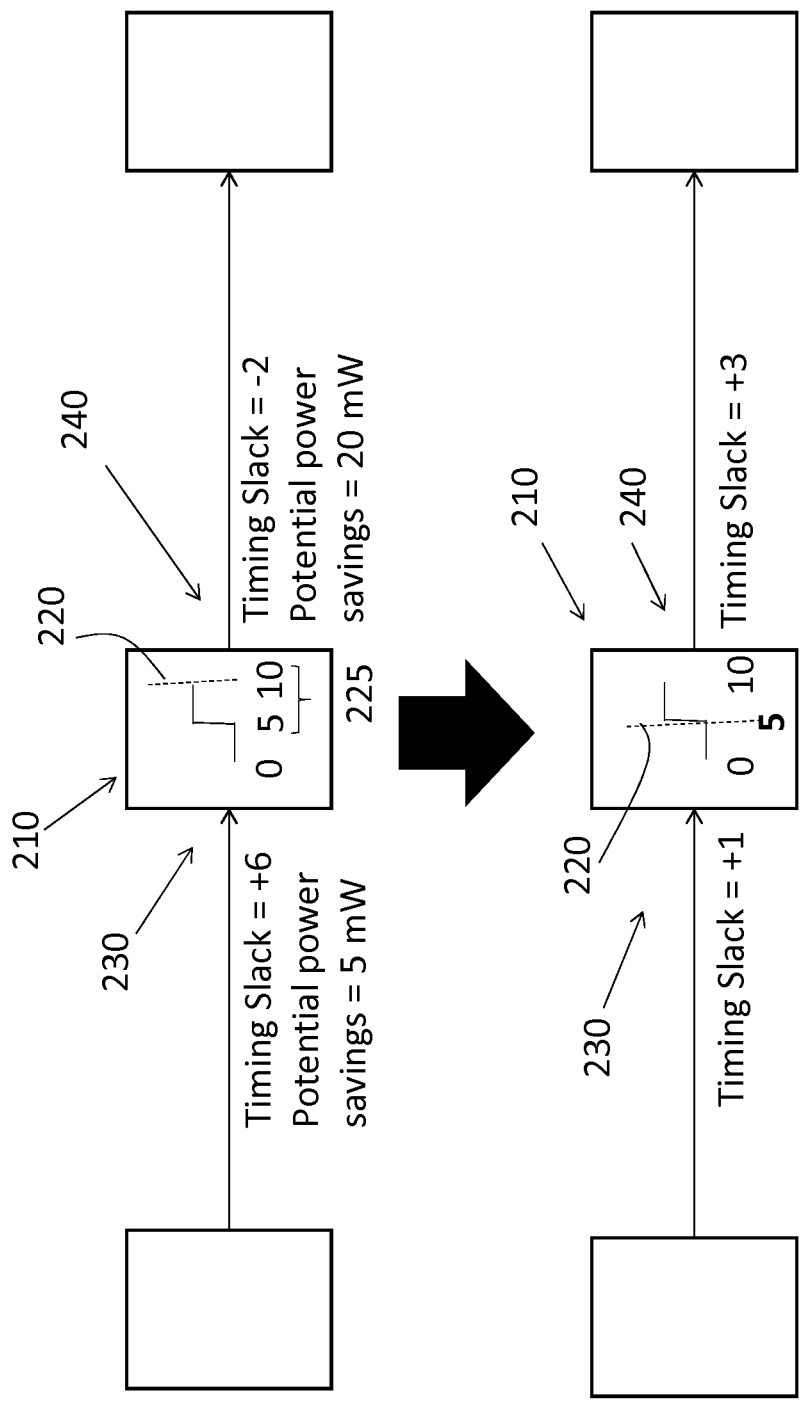
FIG. 2 is an exemplary illustration of power-aware timing adjustment across a transparent latch according to embodiments.

FIG. 2 is an exemplary illustration of power-aware timing adjustment across a transparent latch 210 according to embodiments detailed herein. An exemplary transparent latch 210 is shown before and after the power-aware timing adjustment according to embodiments. As FIG. 2 indicates, the exemplary transparent latch 210 has a transparent interval 225 from 5 to 10 picoseconds (ps). The initial cycle boundary 220 is at the high end of the transparent interval 225 (at 10 ps). The potential power savings at each side of the transparent latch 210 is indicated in FIG. 2 and is 5 milliwatts (mW) at the input 230 side of the transparent latch 210 and as 20 mW at the output 240 side of the transparent latch 210. The potential power savings at each side of a transparent latch 210 is determined based on known techniques and involves a detailed analysis of the logic at the input 230 and output 240 sides. For example, the number of high power circuits at each side is examined, because a higher number of high power circuits indicates a higher potential for power savings. As also indicated, the input 230 side of the transparent latch 210 has timing slack of +6 and the output 240 side of the transparent latch 210 has a timing slack of −2. That is, the input 230 side of the exemplary transparent latch 210 has higher positive timing slack and lower potential power savings than the output 240 side. Thus, according to the embodiments herein, the cycle boundary 220 is moved to the low side (to 5 ps) of the transparent interval 225.

As FIG. 2 indicates, this move of the cycle boundary 220 results in a shift in some of the positive timing slack from the side to which the cycle boundary 220 was moved (the input 230 side in the example) to the other side (the output 240 side in the example). In the example shown in FIG. 2, that shift in timing slack results in a reduction of positive timing slack on the input 230 side from +6 to +1 and an increase in positive timing slack on the output 240 side from −2 to +3. As noted above, an increase in positive timing slack facilitates an increase in power reduction. That is, power at the output 240 side of the exemplary transparent latch 210 may be reduced (to use some of that 20 mW potential power savings) without missing timing requirements because of the increased timing slack available at the output 240 side.

Generally, the adjustment to the cycle boundary 220 follows:

$$(OSin - adjust) - (K*PPSin) = (OSout + adjust) - (K*PPSout) \quad [EQ.\ 1]$$

In EQ. 1, OSin is the original slack on the input 230 side of the transparent latch 210 and OSout is the original slack on the output 240 side of the transparent latch 210. The adjust variable is the slack adjustment value, which may be a positive or negative value. The value of adjust may not exceed the width of the transparent interval 225 of the clock. That is, the adjusted cycle boundary 220 must stay within the transparent interval 225. K is a weighting factor in ps/mW that indicates a weighting on the power savings potential. K may be user-specified, and as K increases, the shift in timing slack from one side to the other increases. PPSin is the potential power savings on the input 230 side, and PPSout is the potential power savings on the output 240 side. According to some embodiments, a threshold may be set on (OSin−adjust), on (OSout+adjust), or both such that the resulting slack at the input 230 side, the output 240 side, or both does not fall too low. The thresholds for the input 230 and output 240 sides may be different. The slack values described above may be obtained from a deterministic (single corner) static timing analysis, or may be projected values obtained from a statistical timing run, or may be canonical slacks from a statistical static timing analysis, or may be obtained as a combination of slack values from multiple such analyses described above (e.g., slack values may be obtained from sampling multiple deterministic static timing analyses).

Figure 3:
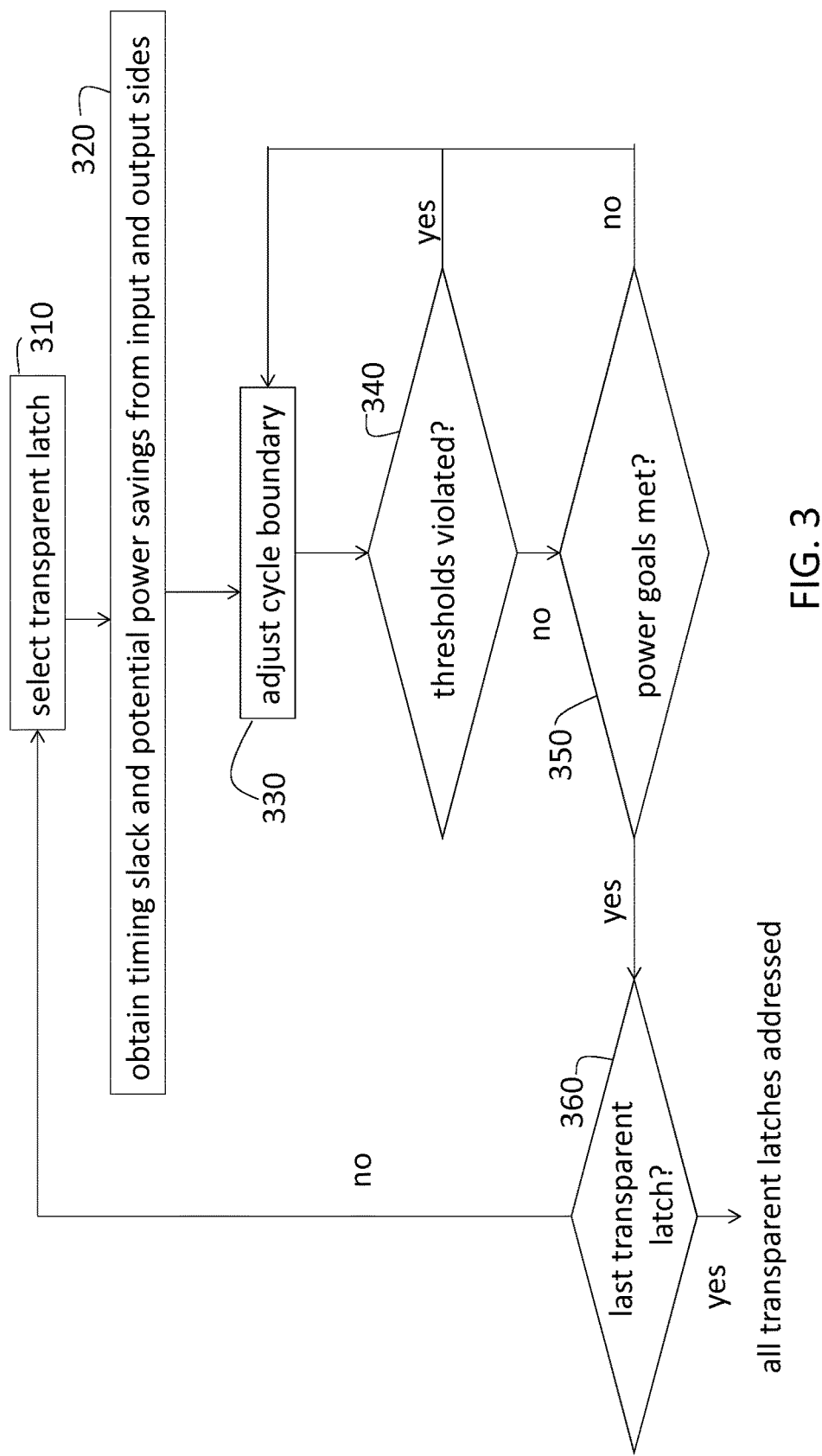
FIG. 3 is a process flow of a method to implement timing adjustments across transparent latches according to embodiments.

FIG. 3 is a process flow of a method to implement timing adjustments across transparent latches 210 according to embodiments. At block 310, selecting a transparent latch 210 begins the process. Obtaining timing slack and potential power savings from the input 230 and output 240 sides of the selected transparent latch 210, at block 320, provides an indication of which side has the greater potential power savings, as well as the positive timing slack on the other side. In the example discussed with reference to FIG. 2, the output 240 side has the greater potential power savings, and the positive timing slack on the other side (input 230 side) is +6 initially. Adjusting the cycle boundary, at block 330, includes setting the weighting factor, K, and using EQ. 1 to determine how much to shift the cycle boundary 220 (toward the side with less potential power savings). As the discussion above of K and EQ. 1 indicates, an adjust value will be determined using a K that corresponds with the degree of excess positive timing slack on the side of the transparent latch 210 that has less potential power savings. Thus, if the exemplary transparent latch 210 in the example shown in FIG. 2 had a timing slack of +3 on the input 230 side initially (rather than +6), then adjust would be determined (according to EQ. 1) with a lower K or lower weighting factor than if timing slack were +6. On the other hand, if the original slack (OSin) at the input 230 of the transparent latch 210 in FIG. 2 were +10 (rather than +6), then adjust would be determined with a higher K, because more positive timing slack is available for adjustment to the output 240 side.

At block 340, checking thresholds includes ensuring that the adjusted cycle boundary 220 is still within the transparent interval 225. Thus, for example, the absolute value of adjust may not be greater than a width of the transparent interval 225. Additionally, thresholds may be set and checked for (OSin−adjust) and (OSout+adjust) in EQ. 1, for example. That is, minimum positive timing slack values may be ensured at the input 230 and output 240 sides. As noted above, these minimums may not be the same at the input 230 and output 240 sides. If any thresholds are violated, adjusting the cycle boundary 220, at block 330, is repeated with a different K. These processes (blocks 330 and 340) may be repeated, as needed. Once an adjusted cycle boundary 220 is obtained that passes all the thresholds at block 340, the power goals are checked at 350. That is, with the adjusted cycle boundary 220 and reduced power, it is determined if timing requirements are met. If they are not, then power must be increased and, thus, the power savings goal is not met. Again, the processes (330 through 350) may be repeated, as needed, to meet power savings goals without violating any thresholds. After the power goals are met for a given transparent latch, a check is done, at block 360, of whether all the transparent latches 210 have been addressed. If not, the processes are all repeated beginning at block 310 with the selection of a new transparent latch 210.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of implementing timing adjustments across a transparent latch of an integrated circuit, the method comprising:
    obtaining, using a processor, initial input timing slack and input potential power savings at an input of the transparent latch;
    obtaining, using the processor, initial output timing slack and output potential power savings at an output of the transparent latch; and
    adjusting a cycle boundary of the transparent latch to obtain a new input timing slack at the input of the transparent latch and a new output timing slack at the output of the transparent latch, wherein the cycle boundary is a time period within an active clock interval of the transparent latch, the new input timing slack is greater than the initial input timing slack based on the input potential power savings being greater than the output potential power savings, the new output timing slack is greater than the initial output timing slack based on the output potential power savings being greater than the input potential power savings, and the adjusting the cycle boundary is performed and provided for subsequent manufacturing of the integrated circuit.

2. The method according to claim 1, wherein the adjusting the cycle boundary includes ensuring that the cycle boundary remains within an active clock duration of the transparent latch.

3. The method according to claim 1, wherein the adjusting the cycle boundary includes ensuring that the new input timing slack is greater than a threshold input timing slack based on the new input timing slack is less than the initial input timing slack.

4. The method according to claim 1, wherein the adjusting the cycle boundary includes ensuring that the new output timing slack is greater than a threshold output timing slack based on the new output timing slack is less than the initial output timing slack.

5. The method according to claim 1, further comprising performing the adjusting the cycle boundary iteratively for each of a set of the transparent latches of the integrated circuit.

6. The method according to claim 1, wherein the adjusting the cycle boundary is based on a weighting factor, K.

7. The method according to claim 6, wherein the adjusting the cycle boundary is according to:

$$(OSin-adjust)-(K*PPSin)==(OSout+adjust)-(K*PPSout), \text{where}$$

OSin is the initial input timing slack, PPSin is the input potential power savings, OSout is the initial output timing slack, PPSout is the output potential power savings, and adjust is a positive or negative integer by which the initial input timing slack and the initial output timing slack are adjusted.

8. The method according to claim 6, wherein increasing K increases a difference between the initial input timing slack and the new input timing slack and between the initial output timing slack and the new output timing slack.

9. A system to implement timing adjustments across a transparent latch of an integrated circuit, the system comprising:
    a memory device configured to store initial input timing slack and input potential power savings at an input of the transparent latch and initial output timing slack and output potential power savings at an output of the transparent latch; and
    a processor configured to adjust a cycle boundary of the transparent latch to obtain a new input timing slack at the input of the transparent latch and a new output timing slack at the output of the transparent latch, wherein the cycle boundary is a time period within an active clock interval of the transparent latch, the new input timing slack is greater than the initial input timing slack based on the input potential power savings being greater than the output potential power savings, the new output timing slack is greater than the initial output timing slack based on the output potential power savings being greater than the input potential power savings, and the processor adjusting the cycle boundary is performed and provided for subsequent manufacturing of the integrated circuit.

10. The system according to claim 9, wherein the processor ensures that the cycle boundary remains within an active clock duration of the transparent latch.

11. The system according to claim 9, wherein the processor ensures that the new input timing slack is greater than a threshold input timing slack based on the new input timing slack is less than the initial input timing slack, and ensures that the new output timing slack is greater than a threshold output timing slack based on the new output timing slack is less than the initial output timing slack.

12. The system according to claim 9, wherein the processor adjusts the cycle boundary iteratively for each of a set of the transparent latches of the integrated circuit.

13. The system according to claim 9, wherein the processor adjusts the cycle boundary based on a weighting factor, K.

14. The system according to claim 13, wherein the processor adjusts the cycle boundary according to:

$$(OSin-adjust)-(K*PPSin)==(OSout+adjust)-(K*PPSout), \text{where}$$

OSin is the initial input timing slack, PPSin is the input potential power savings, OSout is the initial output timing slack, PPSout is the output potential power savings, and adjust is a positive or negative integer by which the initial input timing slack and the initial output timing slack are adjusted.

15. The system according to claim 13, wherein K is input to the processor by a user, and as K increases a difference between the initial input timing slack and the new input timing slack and between the initial output timing slack and the new output timing slack increases.

16. A computer program product for implementing timing adjustments across a transparent latch of an integrated circuit, the computer program product comprising a computer readable storage medium having program instructions embodied therewith, the program instructions executable by a processor to perform a method comprising:
    obtaining initial input timing slack and input potential power savings at an input of the transparent latch;
    obtaining initial output timing slack and output potential power savings at an output of the transparent latch; and adjusting a cycle boundary of the transparent latch to obtain a new input timing slack at the input of the transparent latch and a new output timing slack at the output of the transparent latch, wherein the cycle boundary is a time period within an active clock interval of the transparent latch, the new input timing slack is greater than the initial input timing slack based on the input potential power savings being greater than the output potential power savings, the new output timing slack is greater than the initial output timing slack based on the output potential power savings being greater than the input potential power savings, and the adjusting the cycle boundary is performed and provided for subsequent manufacturing of the integrated circuit.

17. The computer program product according to claim 16, wherein the adjusting the cycle boundary includes ensuring that the cycle boundary remains within an active clock duration of the transparent latch.

18. The computer program product according to claim 16, wherein the adjusting the cycle boundary includes ensuring that the new input timing slack is greater than a threshold input timing slack based on the new input timing slack is less than the initial input timing slack or ensuring that the new output timing slack is greater than a threshold output timing slack based on the new output timing slack is less than the initial output timing slack.

19. The computer program product according to claim 16, further comprising performing the adjusting the cycle boundary iteratively for each of a set of the transparent latches of the integrated circuit.

20. The computer program product according to claim 16, wherein the adjusting the cycle boundary is according to:

$$(OSin - adjust) - (K*PPSin) == (OSout + adjust) - (K*PPSout), \text{ where}$$

OSin is the initial input timing slack, PPSin is the input potential power savings, OSout is the initial output timing slack, PPSout is the output potential power savings, K is a weighting factor, and adjust is a positive or negative integer by which the initial input timing slack and the initial output timing slack are adjusted, wherein increasing K increases a difference between the initial input timing slack and the new input timing slack and between the initial output timing slack and the new output timing slack.

* * * * *